United States Patent Office 3,316,309
Patented Apr. 25, 1967

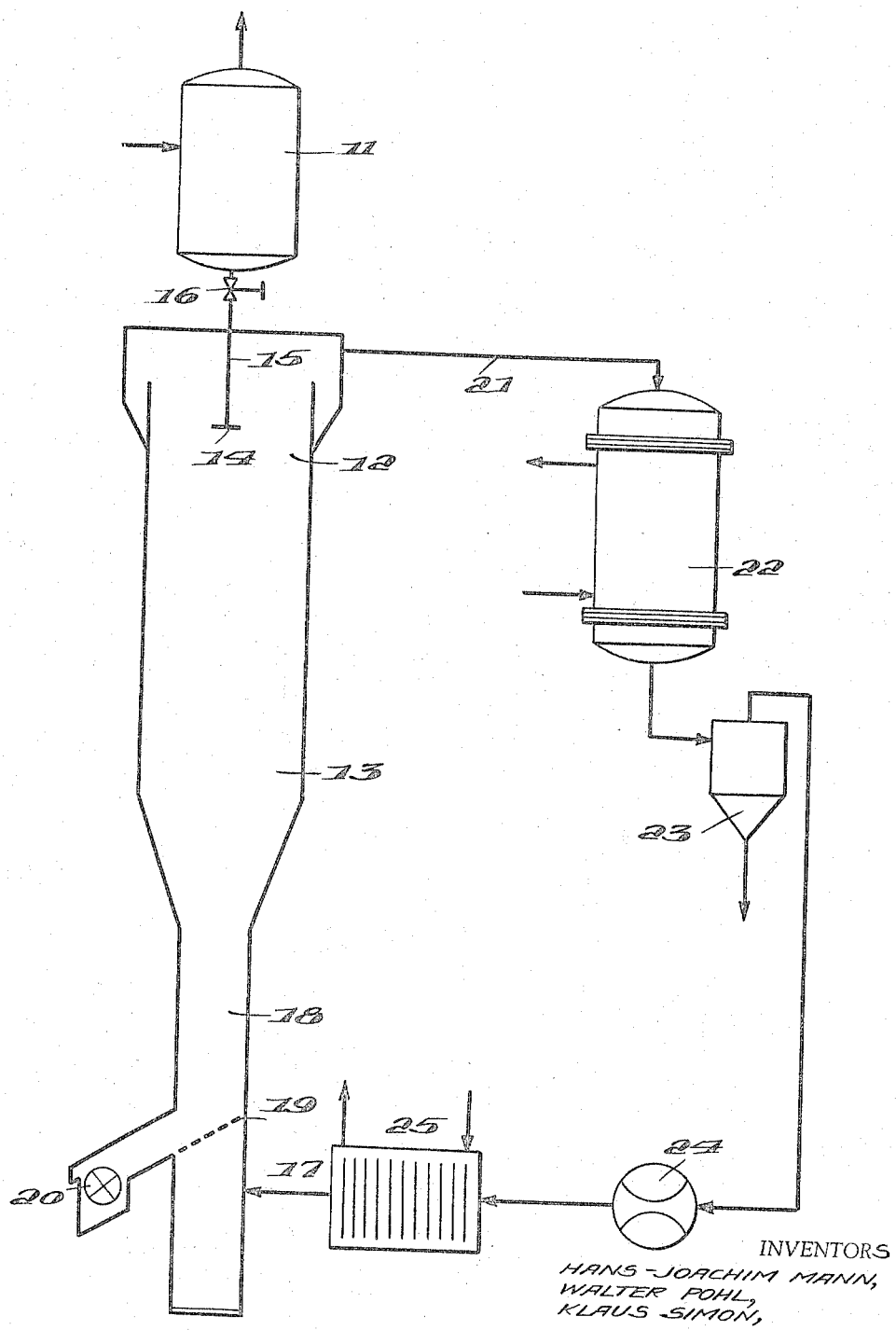

3,316,309
PROCESS FOR THE PRODUCTION OF FREE FLOWING PARAFORMALDEHYDE
Hans-Joachim Mann, Mainz (Rhine), Walter Pohl, Gotzenhain uber Langen, and Klaus Simon, Buchschlag uber Sprendlingen, Germany, assignors to Deutsche Gold- und Silber-Scheideanstalt vormals Roessler, Frankfurt am Main, Germany
Filed Nov. 12, 1964, Ser. No. 410,423
Claims priority, application Germany, Nov. 14, 1963, D 42,931
3 Claims. (Cl. 260—615.5)

The present invention relates to an improved process for the production of free flowing paraformaldehyde and the resultant novel product.

Paraformaldehyde, which is a mixture of polyoxymethylene hydrates of the formula $HO(CH_2O)_nH$ wherein $n$ can be a number between 8 and 30, is formed by known procedures by the stepwise concentration of aqeuos formaldehyde solutions. The concentrates with formaldehyde contents of over 70% by weight are water clear liquids at their boiling point, but upon cooling soon solidify to wax-like substances. Further, dehydration of these hydrogels as well as the transportation, grinding and sieving of the dry products provide considerable technical problems and furthermore are rather costly with regard to energy and time. In addition, the dry end product is not stable on storage. It ages especially at temperatures over 20° C. and thereby loses its reactivity. As the free, that is not chemically bound, water contained in the product presents an especially good aging inhibitor, an aim in the commercial production of paraformaldehyde is to leave as much free water as possible in the end product. However, if such free water content is over 1% by weight the product, in view of its tackiness, can only be conveyed pneumatically with great difficulty and furthermore cannot be pulverized in mills of usual construction. Subsequent moistening of the ground, dry pulverized paraformaldehyde not only is expensive but also does not lead to the desired stability against aging in the product.

The handling of the highly concentrated solutions causes difficulties in the production of paraformaldehyde by the concentration of aqueous formaldehyde solutions as, upon cooling, obligomers separate out or the concentrate solidifies and clogs conduits and valves. Furthermore, as the hydrogel produced is a poor heat conductor and condenses further upon subsequent heating, conduits and valves clogged therewith are not easily cleared simply by remelting of the solidified hydrogel.

According to the invention it was found that a free flowing paraformaldehyde product could be obtained in a single operation by spraying an aqueous formaldehyde concentrate containing 80 to 90%, preferably about 85%, of $CH_2O$ into a spray drier constructed so as to maintain a fluidized bed of the spray dried product in the lower portion thereof in which the spray dried product is maintained for a short period of time, preferably 5 to 15 minutes, to effect further drying of the product. The product is obtained in the form of small spheres and it possesses only a relatively slight odor of formaldehyde. In view of the very small surface area of the spherical particles, they do not disintegrate upon storage so that the product remains practically dust-free. The good results obtained by combining the fluidized bed with the spray drying could not be foreseen. The poor heat conductivity of the hydrogel mawe is doubtful whether the heat of condensation liberated on solidification could be removed with sufficient rapidity. In view of the known tackiness of the solidified precondensates it was to be expected that they would have to be given an after treatment in a separate apparatus.

The aqueous formaldehyde concentrate is sprayed into the spray drier at a temperature between 105 and 110° C. under a nozzle pressure of 2 to 8 kg./cm.² At 105 to 110° C. the concentrate is a clear liquid. The temperature of the air supplied to maintain the fluidized bed should be between about 40 and 60° C. and preferably be 50° C.

The process according to the invention represents a considerable technical advance as it is possible therewith to produce a free flowing stable paraformaldehyde product by spraying, with considerable savings in energy and working time, concentrated aqueous formaldehyde in a relatively simple apparatus. A completely continuous plant for the production of free flowing paraformaldehyde can be obtained by the provision of a continuous evaporator for the concentration of the aqueous formaldehyde supplied to the combined fluidized bed-spray drier.

The accompanying drawing schematically shows an apparatus suitable for carrying out the process according to the invention.

In carrying out the process according to the invention in the apparatus shown in the drawing, aqueous 40% by weight formaldehyde is supplied to continuous evaporator 11 in which it is concentrated under vacuum to an 85% by weight concentrate. The concentrate is sprayed at a temperature of 105° C. under a pressure of 3 kg./cm.² into the head portion 12 of spray drier 13. Nozzle 14, conduit 15 and valve 16 are heated. The air necessary for the fluidized bed is introduced through conduit 17. The formaldehyde concentrate leaves nozzle 14 in the form of droplets which solidify as they drop countercurrently to the warm air which rises through the upper widened portion of the apparatus at a velocity of about 0.5-0.7 m./sec. The resulting spherical particles reach the narrowed lower portion 18 of the apparatus in which the fluidized bed is maintained in about 2 seconds. They then remain in such fluidized bed for about 10 minutes. The upward velocity of the air in the region of the fluidized bed is about 2-3 m./sec. The exterior of the resulting particles is sufficiently dry that they leave the apparatus over the sieve plate 19 through discharge means 20 as a free flowing product.

The air which leaves the top of the spray drier 13 through conduit 21 is passed through condenser 22, and separator 23 in which the condensed water vapor and formaldehyde are separated off and is then recycled to the bottom of the apparatus over blower 24, heat exchanger 25 and conduit 17.

In order that the process according to the invention be carried out successfully it is necessary that the formaldehyde content of the aqueous concentrate supplied to the spray drier be exactly controlled. A minimum concentration of 80% by weight must be maintained. If a lower concentration is employed the droplets formed do not solidify during their passage through the rising warm air and fall down through the drier as liquids and clog the sieve plate under the fluidized bed zone. Concentrates containing over 90% by weight of formaldehyde can no longer be handled as clear liquid melts.

One or two material nozzles of various constructions can be used as the spray nozzle, preferably a single material nozzle with a bore 5 mm. in diameter is used. The pressure necessary for the spraying can be provided by a pump of suited construction or by steam or hot air as a second material. As has already been mentioned, spray pressures of 2 to 8 kg./cm.² are preferably employed. The optimum pressure depends upon the particular nozzle used.

The combined fluidized bed-spray drier must be so constructed that the proper velocity gradient of, for example 2-3 down to 0.5-0.7 m./sec. of the rising drying air can be exactly maintained. If the velocity is too low the sieve plate at the bottom becomes obstructed whereas, f it is too high, the material which is in the form of fog droplets is carried out of the top of the spray drier by the air stream.

The temperature of the air introduced into the drier, as has already been mentioned above, must be between 40° and 60° C. If lower temperatures are employed sufficient drying of the sprayed material is not attained and the material leaves the drier while still in a tacky condition. At higher temperatures the sprayed droplets do not solidify sufficiently and the sieve plate becomes clogged. Furthermore, considerable quantities of formaldehyde are then contained in the exhaust gases.

The temperatures of the drying air supplied to maintain the fluidized bed and its upward velocity above the fluidized bed must be so adjusted with respect to each other that the formaldehyde concentrate droplets solidify as they drop through the space above the fluidized bed so that they are solid when they enter the bed. The upward velocity of the drying air above the fluidized bed, of course, must be insufficient to support the droplets of the concentrate which have been sprayed in so that they can drop through such rising air into the fluidized bed.

The product obtained according to the invention consists of white, spherical, particles with diameters between about 0.1 and 1.0 mm. With optimal spray nozzle adjustment about 75% of the product consists of particles with diameters between 0.4 and 0.6 mm. The formaldehyde content thereof is at least 88% by weight and the free water content is at least 5% by weight. The particles, in view of their dry exterior surfaces, are free flowing. On the other hand, the water containing gel condition in the interior of such particles ensures stability of the paraformaldehyde product on aging. In view of the small surface area of the spherical particles they do not disintegrate and the product remains practically dust free after long periods of storage. The paraformaldehyde product furthermore, is very reactive and is easily dissolved in water and in phenol. The desirable properties attained in the product according to the invention provide considerable advantages for many intended uses, such as in the production of condensation products.

The following examples will serve to illustrate the invention with reference to several embodiments thereof as compared to procedures in which the critical concentration and temperature limits were not maintained. In such examples the proportions are given by weight unless specified otherwise.

*Example 1*

5,000 parts of an aqueous 85.7% formaldehyde concentrate were sprayed into an apparatus as described above at a temperature of 105° C. and a pressure of 3 kg./cm.$^2$ using a Laval nozzle with a bore 5 mm. in diameter. The temperature of the drying air introduced into the bottom of the apparatus was 50° C. 4500 parts of a free flowing paraformaldehyde in the form of spherical particles of an average diameter of 0.4 to 0.6 mm. were obtained. The formaldehyde content thereof was 88%. On the other hand, when the process was repeated using a drying air temperature of 80° C. instead of 50° C. the sprayed droplets did not completely solidify and a tacky product which only partially was in the form of spherical particles was obtained. Again, when the same apparatus was used, except that a spray nozzle with a bore diameter of 3 mm. instead of 5 mm. was used with a spray pressure of 4 kg./cm.$^2$ and only a 75% formaldehyde concentrate and a drying air temperature of 30° C. was used, the paraformaldehyde product obtained was in the form of spherical particles 0.2 to 2 mm. in diameter. They were very tacky and had to be given an after treatment.

*Example 2*

An aqueous 85.7% formaldehyde concentrate was sprayed at a temperature of 105° C. into an apparatus as described above at a pressure of 8 kg./cm.$^2$ using a nozzle with a bore diameter of 3 mm. The temperature of the drying air introduced into the bottom of the apparatus was 60° C. The paraformaldehyde product obtained was in the form of free flowing spherical particles.

We claim:

1. A process for the production of a free flowing paraformaldehyde product which comprises spraying a liquid aqueous formaldehyde concentrate containing 80 to 90% by weight of formaldehyde heated to a temperature between about 105 and 110° C. in the form of droplets into the upper portion of an elongated upright chamber, maintaining a fluidized bed of solid particles of the paraformaldehyde product produced in the lower portion of such chamber, supplying drying air at a temperature between 40 and 60° C. and passing it upwardly therethrough, maintaining an upward velocity of the drying air in the lower portion of the chamber sufficient to form the fluidized bed of the solid particles of the paraformaldehyde product therein and maintaining an upward velocity of the drying air in the upper portion of the chamber which is insufficient to support the droplets of the formaldehyde concentrate being sprayed in, permitting the droplets to solidify as they drop through the rising drying air before they reach the fluidized bed maintaining such solidified droplets within the fluidized bed for a period of about 5 to 15 minutes and then withdrawing the solidified particles from the fluidized bed in a free flowing form.

2. In a process for the production of a free flowing paraformaldehyde product which comprises spraying a liquid aqueous formaldehyde concentrate containing 80 to 90% by weight of formaldehyde in the form of droplets into the upper portion of an elongated upright chamber at a temperature between about 105 and 110° C. and at a pressure between 2 and 8 kg./cm.$^2$, maintaining a fluidized bed of solid particles of the paraformaldehyde product produced in the lower portion of such chamber, supplying drying air at a temperature between 40 and 60° C. and passing it upwardly therethrough, maintaining an upward velocity of the drying air in the lower portion of the chamber sufficient to form the fluidized bed of the solid particles of the paraformaldehyde product therein and maintaining an upward velocity of the drying air in the upper portion of the chamber which is insufficient to support the droplets of the formaldehyde concentrate being sprayed in, the velocity of the drying air in the lower portion of the chamber in the region of the fluidized bed being between 2 to 3 m./sec. and 0.5 to 0.7 m./sec. in the upper portion of the chamber, permitting the droplets to solidify as they drop through the rising drying air before they reach the fluidized bed, maintaining such solidified droplets within the fluidized bed for a period of about 5 to 15 minutes and then withdrawing the solidified particles from the fluidized bed in a free flowing form.

3. The process of claim 2 in which the concentration of the formaldehyde concentrate is about 85% and the temperature of the drying air introduced is about 50° C.

References Cited by the Examiner

UNITED STATES PATENTS

| | | | |
|---|---|---|---|
| 2,568,017 | 9/1951 | MacLean et al. | 260—615.5 |
| 2,568,018 | 9/1951 | MacLean et al. | 260—615.5 |
| 2,992,277 | 7/1961 | Porter | 260—615.5 |

OTHER REFERENCES

Walker, J. F.: Formaldehyde. Reinhold Publishing, New York, N.Y., third edition (pp. 145, 148, 155 relied on).

BERNARD HELFIN, *Acting Primary Examiner.*

LEON ZITVER, *Examiner.*

H. T. MARS, *Assistant Examiner.*